US005440073A

United States Patent [19]

Lin et al.

[11] Patent Number: 5,440,073

[45] Date of Patent: Aug. 8, 1995

[54] ELECTRIC CABLE MOUNTING DEVICE

[76] Inventors: Kuang-Ts'an Lin Lin; Shih-Tzung Liang, both of No. 360, Sec. 1, Min-Sheng N. Rd., Kuei-Shan Hsiang, Taoyuan County, Taiwan

[21] Appl. No.: 235,921

[22] Filed: May 2, 1994

[51] Int. Cl.$^{6}$ .............................................. H02G 15/02

[52] U.S. Cl. .............................. 174/74 R; 174/65 SS; 439/583; 439/584

[58] Field of Search ............... 174/74 R, 74 A, 65 SS; 439/583, 584, 502, 503, 504, 505; 285/323

[56] References Cited

U.S. PATENT DOCUMENTS 3,184,706 5/1965 Atkins ................................ 439/583

4,037,909 7/1977 Trompeter et al. ................. 439/583

FOREIGN PATENT DOCUMENTS 2357922 5/1975 Germany ............................ 439/583

*Primary Examiner*—Morris H. Nimmo

*Attorney, Agent, or Firm*—Morton J. Rosenberg; David I. Klein

[57] ABSTRACT

An electric cable mounting device includes a a connector for fastening to one terminal of en electric apparatus by a screw, a taper jacket fitted into a taper hole on the connector and mounted around the conductor of the electric cable to be mounted, a first hollow screw member having an outer thread portion threaded into an inner thread portion on the connector and stopped against the taper jacket, a clamping ring clamped on the electric cable, and a second hollow screw member mounted around the electric cable and having an outer thread portion threaded into an inner thread portion on the first hollow screw member to tighten up the clamping ring.

1 Claim, 5 Drawing Sheets

ELECTRIC CABLE MOUNTING DEVICE

BACKGROUND OF THE INVENTION

The present invention relates to an electric cable mounting device for fastening an electric cable to one terminal of a storage battery, electric junction box, etc.

FIG. 7 shows a conventional method of mounting an electric cable onto an electric apparatus. The electric cable mounting device is generally comprised of a cable hole, which receives the conductor of the cable to be mounted, a screw hole perpendicularly communicated with the cable hole, and a tightening up screw threaded into the screw hole to hold down the conductor of the electric cable. Because the conductor of the electric cable is squeezed vertically by the tightening up screw, it may be broken easily. Another drawback of this structure of electric cable mounting device is that the limited contact area between the conductor of the electric cable and the tightening up screw is insufficient to hold down the conductor of the electric cable in position, and the impedance tends to increase. Therefore, this structure of electric cable mounting device is not safe in use.

SUMMARY OF THE INVENTION

The present invention has been accomplished to provide an electric cable mounting device which eliminates the aforesaid problems. It is therefore one object of the present invention to provide an electric cable mounting device which fastens the electric cable firmly in position. It is another object of the present invention to provide an electric cable mounting device which is safe in use. It is still another object of the present invention to provide an electric cable mounting device which is easy to install.

DETAILED DESCRIPTION OF THE PREFERRED EMBODIMENT

Figure 1:
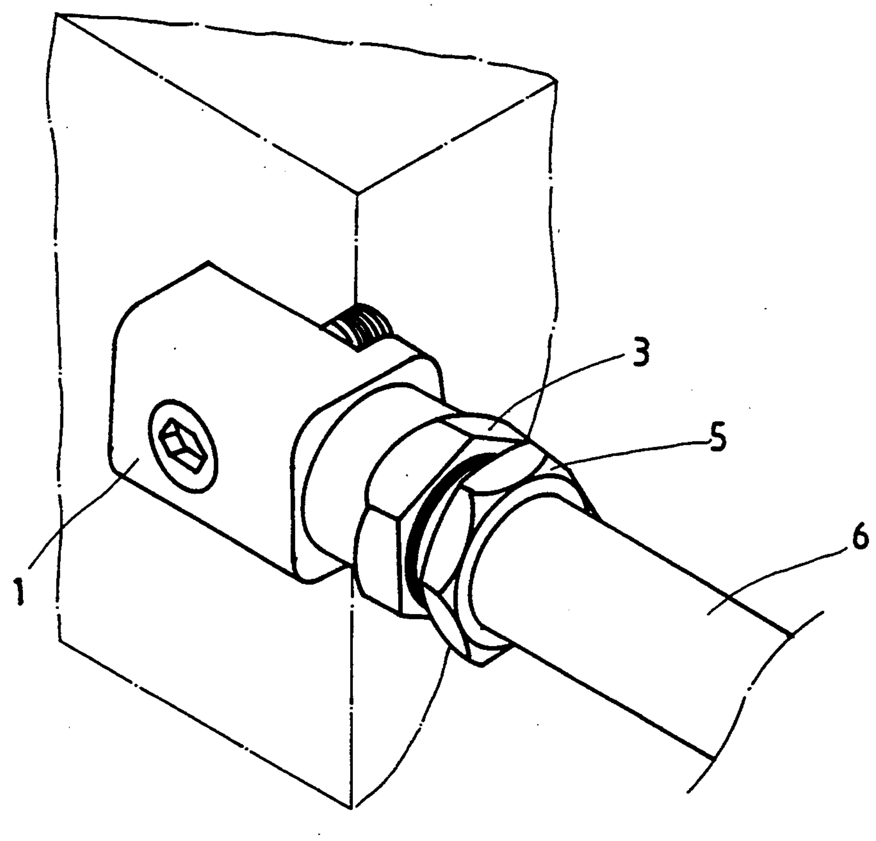
FIG. 1 is an elevational view of an electric cable mounting device according to the preferred embodiment of the present invention.
Figure 2:
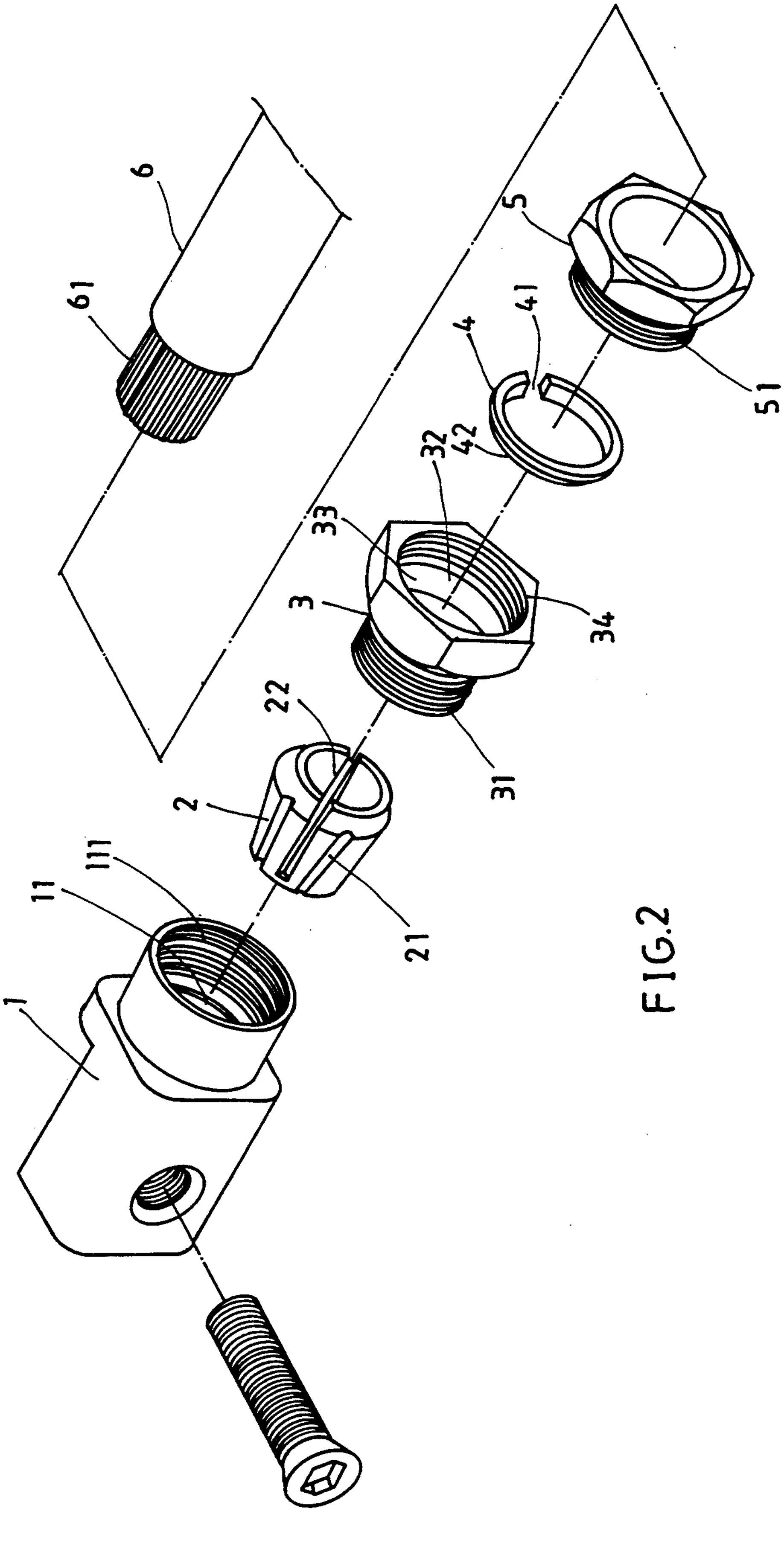
FIG. 2 is an exploded view of the electric cable mounting device shown in FIG. 1.
Figure 3:
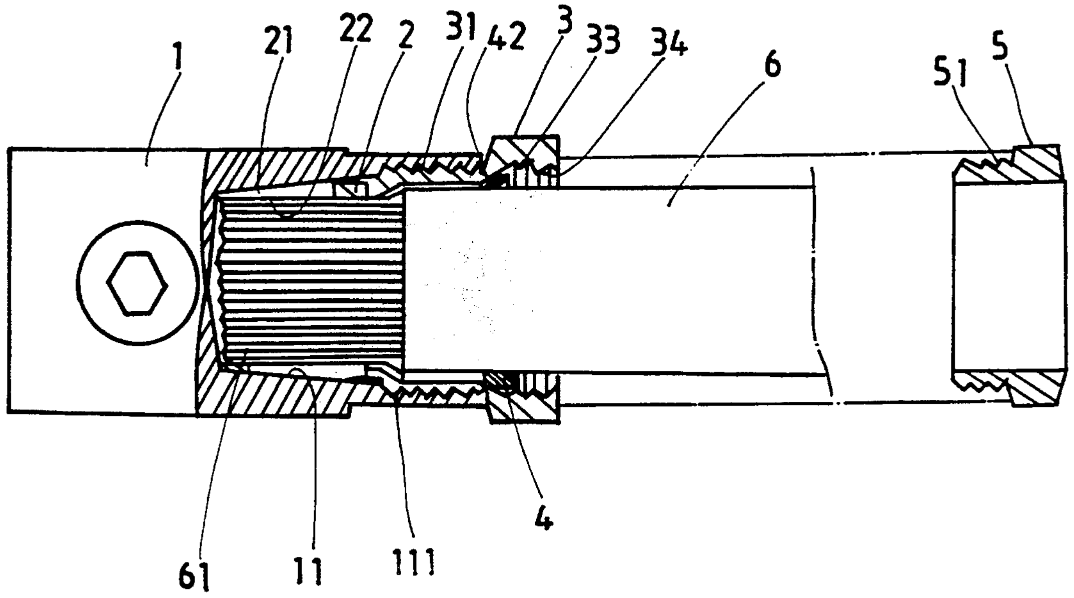
FIG. 3 is a longitudinal view in section of the electric cable mounting device shown in FIG. 1 (before fastening up the second hollow screw member)
Figure 4:
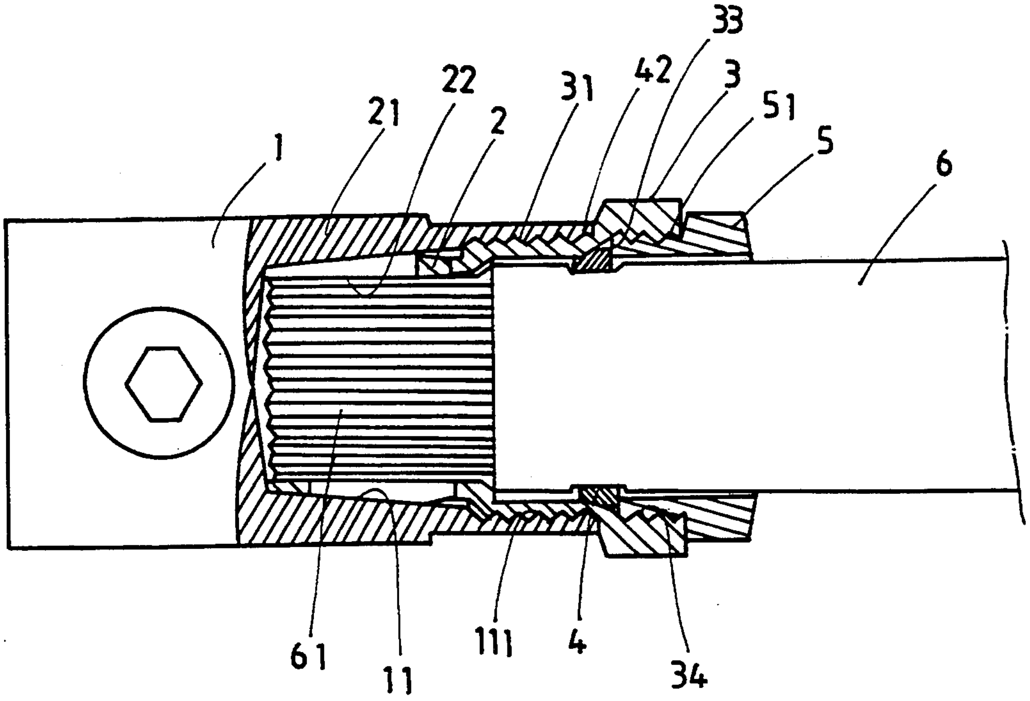
FIG. 4 is similar to FIG. 3 but showing the second hollow screw member fastened.

Referring to FIGS. 1, 2, 3, and 4, an electric cable mounting device in accordance with the preferred embodiment of the present invention is generally comprised of a connector 1 having a taper hole 11 at one end made gradually smaller toward the inside and an inner thread portion 111 made around the periphery of the taper hole 11; a taper jacket 22 mounted around the conductor 61 of the electric cable 6 to be mounted and fitted into the taper hole 11 on the connector 1 and having a straight longitudinal through hole 22 through the longitudinal axis thereof, which receives the conductor 61 of the electric cable 6, and a plurality of longitudinal splits 21 spaced around the outside wall thereof and alternatively arranged in reversed directions; a first hollow screw member 3 having an outer thread portion 31 threaded into the inner thread portion 111 on the connector 1 and stopped against the taper jacket 2, a longitudinal through hole 32 through the longitudinal axis thereof, which receives the electric cable 6, an inner thread portion 34 made around the periphery of the longitudinal through hole 32 at one end, and a tapered inside wall 32 disposed around the longitudinal through hole 32 in the middle between the inner thread portion 34 and the outer thread portion 31, a clamping ring 4 clamped on the electric cable 6 and received inside the longitudinal through hole 32 of the first and having a split 41 for easy mounting onto the electric cable 6 and a tapered portion 42 at one end fitted into the tapered inside wall 32 of the first hollow screw member 3; and a second hollow screw member 5 mounted around the electric cable 6 and having an outer thread portion 51 threaded into the inner thread portion 34 of the first hollow screw member 3 to tighten up the clamping ring 4.

Figure 5:
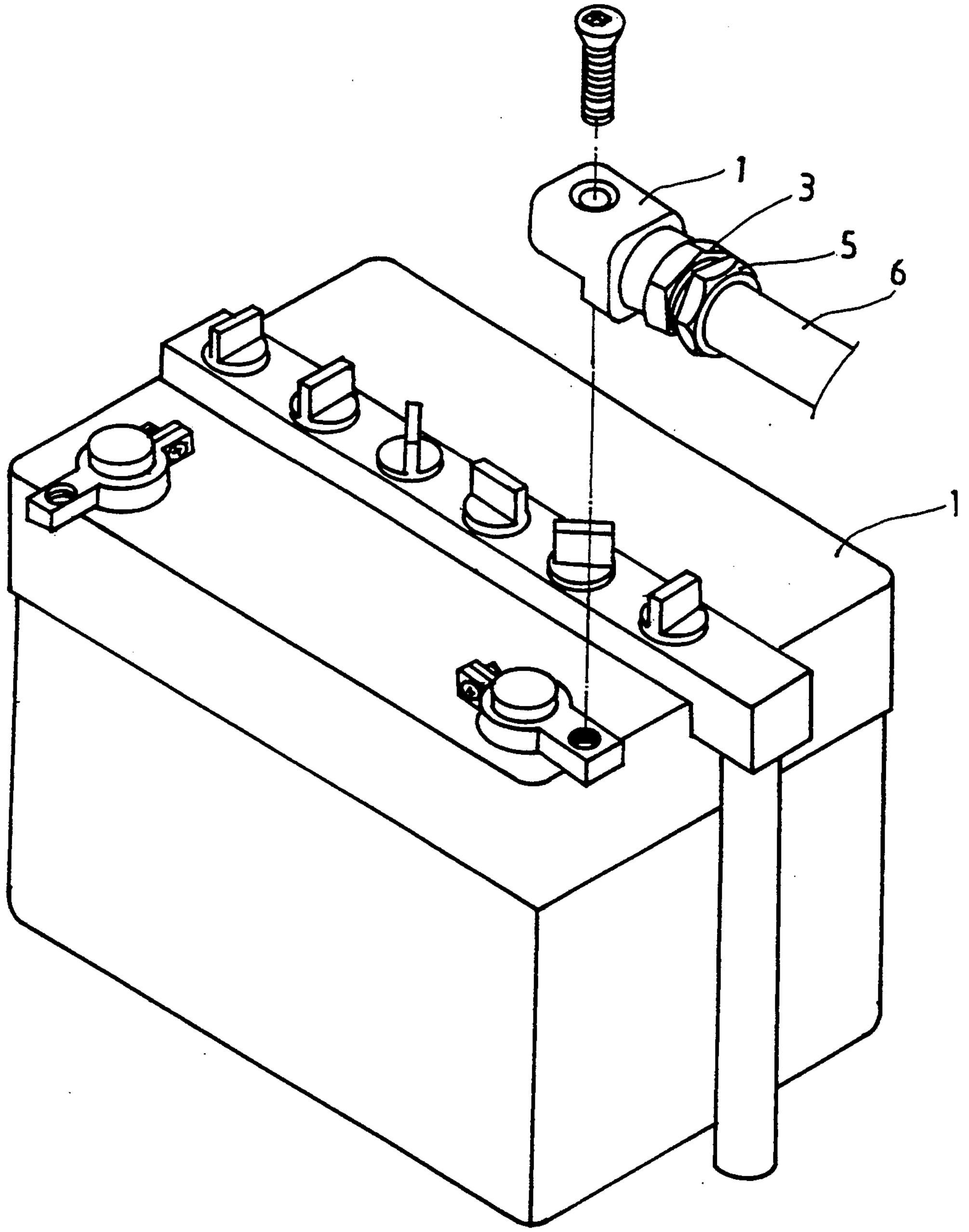
FIG. 5 shows the positioning of the electric cable mounting device of the present invention on a storage battery.
Figure 6:
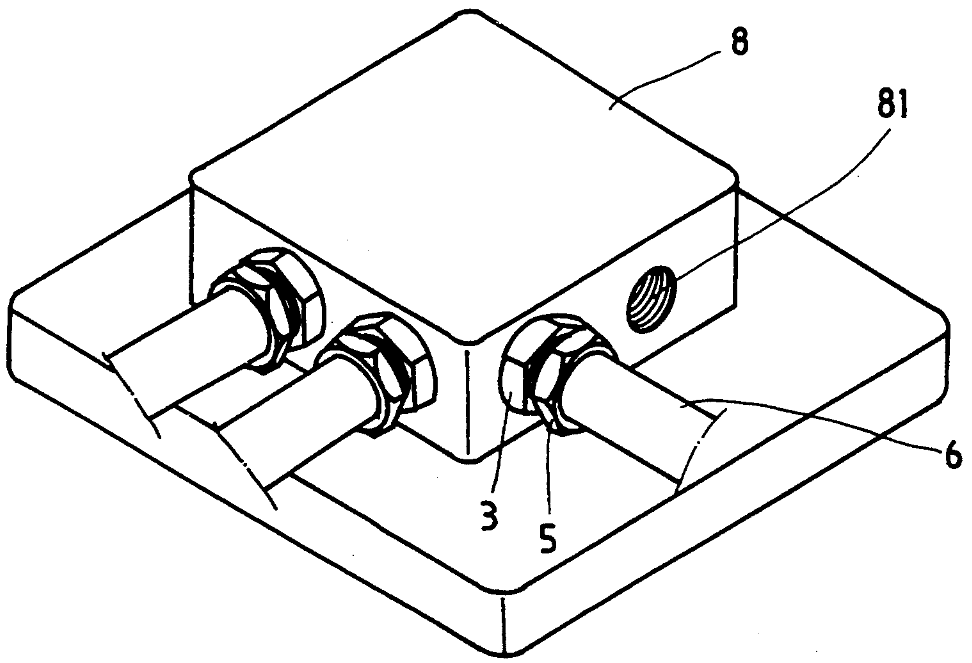
FIG. 6 shows the positioning of the electric cable mounting device of the present invention on an electric junction box.
Figure 7:
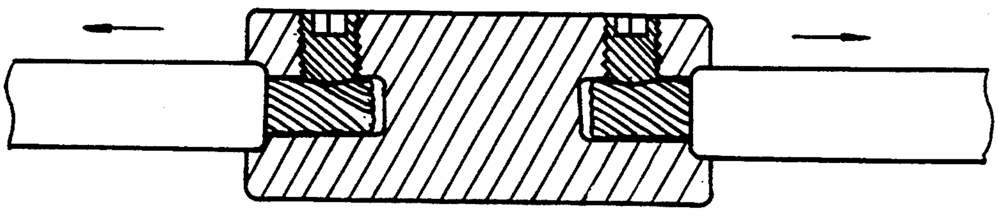
PRIOR ART FIG.7
FIG. 7 is a sectional view of an electric cable mounting device according to the prior art.

Referring to FIGS. 5 and 6, the connector 1 of the electric cable mounting device can be conveniently fastened to one terminal of a storage battery 7 or electric junction box 8 by a screw.

What is claimed is:

1. An electric cable mounting device comprising:

a connector for fastening to one terminal of an electric apparatus, having a taper hole at one end made gradually smaller toward the inside and an inner thread portion made around the periphery of the taper hole;

a taper jacket mounted around the conductor of the electric cable to be mounted and fitted into the taper hole on said connector and having a straight longitudinal through hole through the longitudinal axis thereof, which receives the conductor of the electric cable, and a plurality of longitudinal splits spaced around the outside wall thereof and alternatively arranged in reversed directions;

a first hollow screw member having an outer thread portion threaded into the inner thread portion on said connector and stopped against said taper jacket, a longitudinal through hole through the longitudinal axis thereof, which receives the electric cable, an inner thread portion made around the periphery of the longitudinal through hole of said first hollow screw member at one end, and a tapered inside wall disposed around the longitudinal through hole of said first hollow screw hole in the middle between the inner thread portion and outer thread portion of said first hollow screw hole;

a clamping ring clamped on the electric cable and received inside the longitudinal through hole of said first hollow screw member, said clamping ring having a split for easy mounting onto the electric cable and a tapered portion at one end fitted into the tapered inside wall of said first hollow screw member; and a second hollow screw member mounted around the electric cable, said second hollow screw member having an outer thread portion threaded into the inner thread portion of said first hollow screw member causing said clamping ring compressed onto the electric cable.

* * * * *